United States Patent [19]

Golmanavich

[11] Patent Number: 5,230,852
[45] Date of Patent: Jul. 27, 1993

[54] METHOD OF MAKING A PLASTIC-COVERED TRANSMISSION MEDIUM

[75] Inventor: Jerald L. Golmanavich, Omaha, Nebr.

[73] Assignee: AT&T Bell Laboratories, Murray Hill, N.J.

[21] Appl. No.: 808,083

[22] Filed: Dec. 11, 1991

Related U.S. Application Data

[63] Continuation-in-part of Ser. No. 659,537, Feb. 22, 1991, abandoned, which is a continuation of Ser. No. 419,996, Oct. 11, 1989, abandoned.

[51] Int. Cl.⁵ .............. B29C 31/08; B29C 47/02; B29C 45/14
[52] U.S. Cl. .............. 264/174; 264/75; 264/77; 264/178 R; 264/211.23; 264/237; 264/245; 264/328.17; 425/113; 425/377; 29/825
[58] Field of Search .............. 264/174, 176.1, 211, 264/349, 40.7, 178 R, 288, 237, 175, 75, 77, 211.23, 245, 328.17; 425/113, 114, 145, 377, 376.1; 29/825

[56] References Cited

U.S. PATENT DOCUMENTS

| | | | |
|---|---|---|---|
| 1,987,963 | 1/1935 | Malm | 425/113 |
| 2,610,607 | 9/1952 | Isenberg | 425/113 |
| 2,862,244 | 12/1958 | Robb | 264/211 |
| 2,979,431 | 4/1961 | Perrault | 425/113 |
| 3,041,673 | 7/1962 | Goodwine | 425/113 |
| 3,078,514 | 2/1963 | Gray | 264/174 |
| 3,155,750 | 11/1964 | Dahn, Jr. et al. | 264/40.7 |
| 3,304,282 | 2/1967 | Cadus et al. | 264/174 |
| 3,526,692 | 9/1970 | Onaka | 425/113 |
| 3,712,773 | 1/1973 | Baumgarten | 425/376.1 |
| 4,565,153 | 1/1986 | Corley | 264/174 |
| 4,605,525 | 8/1986 | Baxter | 425/114 |

FOREIGN PATENT DOCUMENTS 57-8139  1/1982  Japan ................... 264/349

*Primary Examiner*—Jeffery Thurlow
*Assistant Examiner*—Mathieu Vargot
*Attorney, Agent, or Firm*—Donald E. Hayes, Jr.

[57] ABSTRACT

In a method of feeding a plastic material to a using apparatus such as a molding press or an extruder, a moldable or extrudable plastic material in elongated strand form is provided. The moldable or extrudable plastic material is arranged such as in a package comprising a plurality of convolutions. The package is supported adjacent to the using apparatus and successive increments of length of the elongated strand material are payed out and fed into the using apparatus.

8 Claims, 2 Drawing Sheets

000
METHOD OF MAKING A PLASTIC-COVERED TRANSMISSION MEDIUM

This application is a continuation-in-part of application Ser. No. 07/659,537, filed on Feb. 22, 1991, which is a continuation of Ser. No. 07/419,996, filed on Oct. 11, 1989, both now abandoned.

TECHNICAL FIELD

This invention relates to methods of and apparatus for the feeding of plastics material to using apparatus. More particularly, it relates to methods of and apparatus for feeding plastic material to molding presses and to extruders for use in manufacturing processes.

BACKGROUND OF THE INVENTION

Plastic material is in widespread use in the manufacture of a variety of articles. For example, plastic material is supplied to molding presses which cause the plastic material to be melted and to be molded to various configurations to provide, for example, housings, toys, containers and the like.

Generally, plastic material for use in a molding press is supplied in the form of pellets to a blender. Depending on the mixture sought to be obtained in the blender, additional plastic material in the form of pellets may be supplied. After the pellets of the plastic materials have been blended together to provide a homogeneous mixture, the mixture is conveyed in batch form to a molding press where it is dried and used in the molding of desired products.

In a similar manner, plastic material is supplied to extruders. Extruders may be used, for example, to apply a plastic covering to a metallic or optical fiber transmission medium or to apply one or more jackets to one or a plurality of the transmission media. Generally, the plastic material to be applied by the extruder is in pellet form. The pellets of the plastic material are supplied from a bulk carrier such as a railroad car which may be positioned outside a building in which the extruder is disposed. The pellets may be conveyed by a pneumatic system from the carrier through the portions of the building to the extruder. In the alternative, the pellets may be provided in relatively large cartons which are positioned adjacent to using apparatus in a manufacturing facility. The pellets are deposited in a hopper of the extruder after which they are fed through each of a plurality of heating zones of the extruders to provide a molten mass of the plastic material of which the pellets are comprised. See, for example, U.S. Pat. No. 3,078,514 which issued on Feb. 26, 1963 in the name of A. N. Gray. Then the molten plastic material is moved into a crosshead of the extruder and through a die onto an elongated material which is being moved through the crosshead.

Problems in the feeding of plastic materials have been observed over the years. For example, when it is desired to obtain a particular color molding material for feeding to a molding press, pellets of one color may be blended with pellets of another color. The mixture of the pellets is fed into the hopper of a molding press. Ones of the pellets may become lodged in portions of the hopper or feed arrangement. As a result, when there is a cutover to another color, the pellets which were not removed during a changeover process may become dislodged and contaminate the new color material.

The same kind of problem also may occur when the compositions of materials used in different products may vary. Lodged particles of one composition which become dislodged may contaminate the pellets of another composition and thereby affect adversely the properties of the material provided by the molding press or by the extruder.

In the conventional plastic material supply systems, care also must be taken to remove dust caused by the fines associated with the pellets.

Furthermore, there has been a concern about the cost of a material handling system for plastic material supplied to molding presses. The additional handling required to process material in a blender prior to the feeding of the material to a using apparatus adds to the cost of the final product. The use of pellets is expensive inasmuch as apparatus which is used to pelletize plastic material generally involves relatively high maintenance costs. Also, it should be apparent that the use of pneumatic conveying systems to transport granular material from railroad hopper cars to using apparatus within a building involves substantial capital and maintenance costs.

What is needed and what is not available in the art are methods and apparatus for feeding plastic material to using apparatus in a manner which overcomes problems in present feeding systems. Also, the sought-after methods and apparatus should be such that they do not entail substantial capital expenditures nor involve high maintenance costs.

SUMMARY OF THE INVENTION

The foregoing problems of the prior art have been overcome by the methods and apparatus of this invention. In a method of providing a supply of plastic material to a using apparatus, a supply of the plastic material in an elongated form is provided. The plastic material in elongated form may be coiled in a plurality of convolutions to form a package. As needed, such portions of the elongated strand material are fed to a using apparatus such as an extruder or a molding press. Should the plastic material to be fed to the using apparatus be a blend of two different compositions, strands of the two or more materials may be fed simultaneously into the extruder or molding press.

Apparatus for carrying out the invention may involve reels or spools or barrels which may be used to hold packages of the elongated strand material to be melted and extruded. The packages of such material may be supported in payoff positions adjacent to using apparatus such as an extruder or a molding press, for example, which is to be fed with such material.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
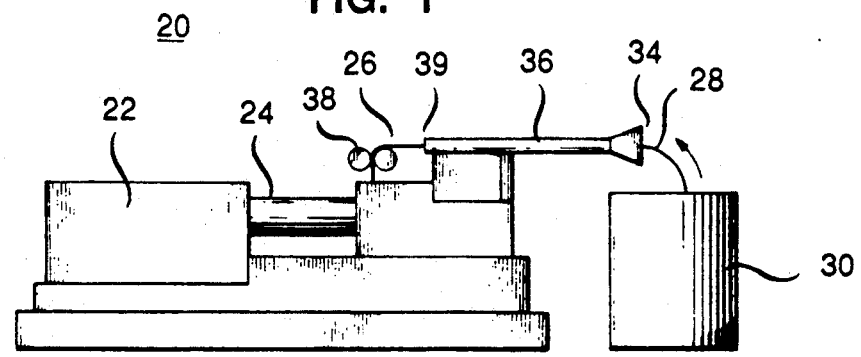
FIG. 1 is a schematic view of a molding press to which may be fed plastic material in accordance with this invention.

Referring now to FIG. 1 there is shown a schematic view of a molding press which is designated generally by the numeral 20 and which may be used to mold various articles from a plastic material. As is seen in FIG. 1, the molding press 20 includes a molding portion 22 and an injection unit 24. The press 20 also includes a plastic feeding portion 26.

The plastic feeding portion 26 is adapted to feed continuously plastic material in the form of elongated strand material 28 into the injection unit 24. In order to accomplish this, the feeding portion 26 includes a supply of plastic material from which the articles are to be molded. The supply may be a container 30 such as a barrel or may be a spool in which or on which is disposed a mass of convolutions of the plastic material to be supplied.

Figure 2:
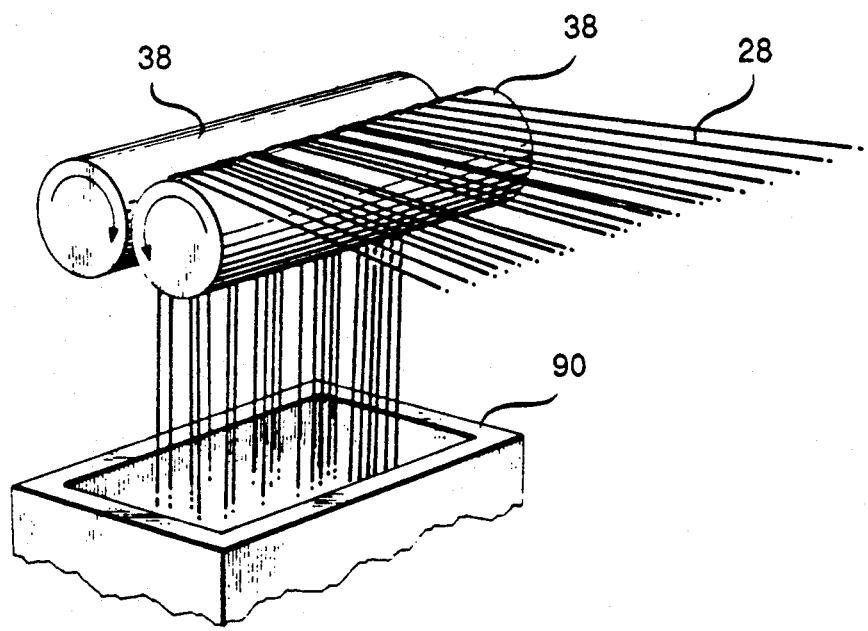
FIG. 2 is a detail view of a portion of the press of FIG. 1 to illustrate the feeding of plastic material to the press in accordance with this invention.

From the supply 30, the plastic material is moved along a path of travel to the injection unit 24. As the elongated strand plastic material is payed out, it is moved into a flared entrance 34 of a feed tube 36. The movement is caused by a pair of oppositely rotating rollers 38—38 (see also FIG. 2) which are disposed adjacent to an exit end 39 of the feed tube 36. Initially, the elongated strand material is strung-up through the feed tube and then between the rollers 38—38 into the injection unit 24. As is seen in FIG. 2, a plurality of strands 28—28 of the plastic material may be fed into a using apparatus.

The rollers 38—38 which rotate in opposite directions are effective to pull the elongated strand material 28 from the container or spool. In order to enhance the feeding of the plastic material 28 into the injection unit 24, the rollers may be grooved or may be faced with a material having a relatively high coefficient of friction.

In the preferred embodiment of the present invention, a plurality of grooves are aligned circumferentially around one of the rollers 38. The circumferential alignment of the grooves provides for a more controllable blending of the elongated strands. By establishing a physical separation between each of the individual strands, the specific orientation of each strand is reliably maintained within the desired guidelines throughout the effected stage of processing.

The specific blend of rigid or semi-rigid thermoplastic material eventually produced may be conveniently and efficiently controlled as a result of the circumferential grooves in the selected roller. To accurately control the exact ratio of different materials being incorporated into the blend material produced, various grooves are loaded with one of a variety of types of elongated strand materials. Unlike existing systems which combine large webs of material to create one product, the present invention allows for an extremely high degree of accuracy in selecting and blending a variety of different types of material. Such accurate control of the blending process allows for the precise manufacture of various products made from thermoplastics such as polycarbonate, for example.

Specifically, the present invention incorporates at least eleven (11) parallely aligned, circumferentially-oriented grooves around the grooved roller. However, for the purposes of illustration, assume that there are twenty (20) grooves along the grooved roller. With such an arrangement, if it were desirable to create a blend comprising ten percent (10%) of a selected type of additive material with the remaining ninety percent (90%) of the blend produced being a type of base resin, the additive material may be centrally positioned in the two center grooves of the grooved roller with the remaining eighteen (18) grooves providing transport channels for the base resin. As should be readily apparent, the particular number of grooves utilized and the exact material transported through each channel are mere matters of design choice deemed to be within the scope of the present invention.

The base resins commonly used at present are generally clear in color. However, it is very often desirable to create a blended product which may be identifiable by its permanent coloring. It may also be advantageous to have substantial control over the ultimate color of the blended product. By utilizing an additive material with the desired color characteristics, the present invention provides an easy mechanism for controllably blending a permanent coloring to the generally colorless base resin. It should also be noted that the additive material may be used to provide or enhance various other characteristics desired in the ultimate thermoplastic blend produced.

Yet another advantage to the circumferentially-aligned groove construction of the present invention is that the number of grooves may be chosen to correspond with the manner in which the material is formed subsequent to extrusion since typical extruders put out between six (6) and one-hundred-forty-one (141) strands. Furthermore, by leaving certain grooves empty during a particular stage of processing, they may be prepared for loading with a new or different material prior to the end of the previous processing stage. Therefore, processing a new lot of material may be started while the processing of the prior lot continues. To assist in the monitoring of such a process, sensors are applied easily to a chosen feed track to provide a feedback signal when that feed track is empty or the elongated strand is misoriented.

In the preferred embodiment of the present invention, only one of the rollers 38 is grooved while the other roller may be smooth. Therefore, the smooth roller acts as a friction roller to apply a positive feed force to the elongated strands to assist their movement through the processing path. As stated earlier, the main objective of the grooved roller is to ensure a proper orientation of the strands.

The above-described roller arrangement obviates the need for the extruder to "pull" the material from a spool or box. With the particular type of material being fed along the processing path of the present invention, such pulling force by the extruder would likely sever at least some of the elongated strands. Therefore, to overcome this problem while yet maintaining substantial control over the appropriate orientation of the various strands, the present invention utilizes a grooved roller which is cooperatively disposed with a smooth roller.

With the foregoing described arrangement, the feed of the plastic material may be continuous and uninterrupted. The material handling aspect of the molding is simplified over the prior art process of using plastic pellets. Not only is the expense of making plastic pellets saved, but also expensive facilities for conveying or transporting the pellets from the point of delivery to a using apparatus become unnecessary.

The principles of this invention also may be used to provide a supply of plastic material to a manufacturing line for providing insulated transmission media. Such transmission media may be metallic conductors or may be optical fiber.

Figure 4:
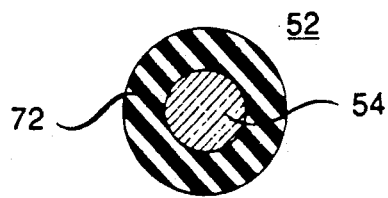
FIG. 4 is an end view in section of an insulated conductor which is manufactured on the line shown in FIG. 3.
Figure 3:
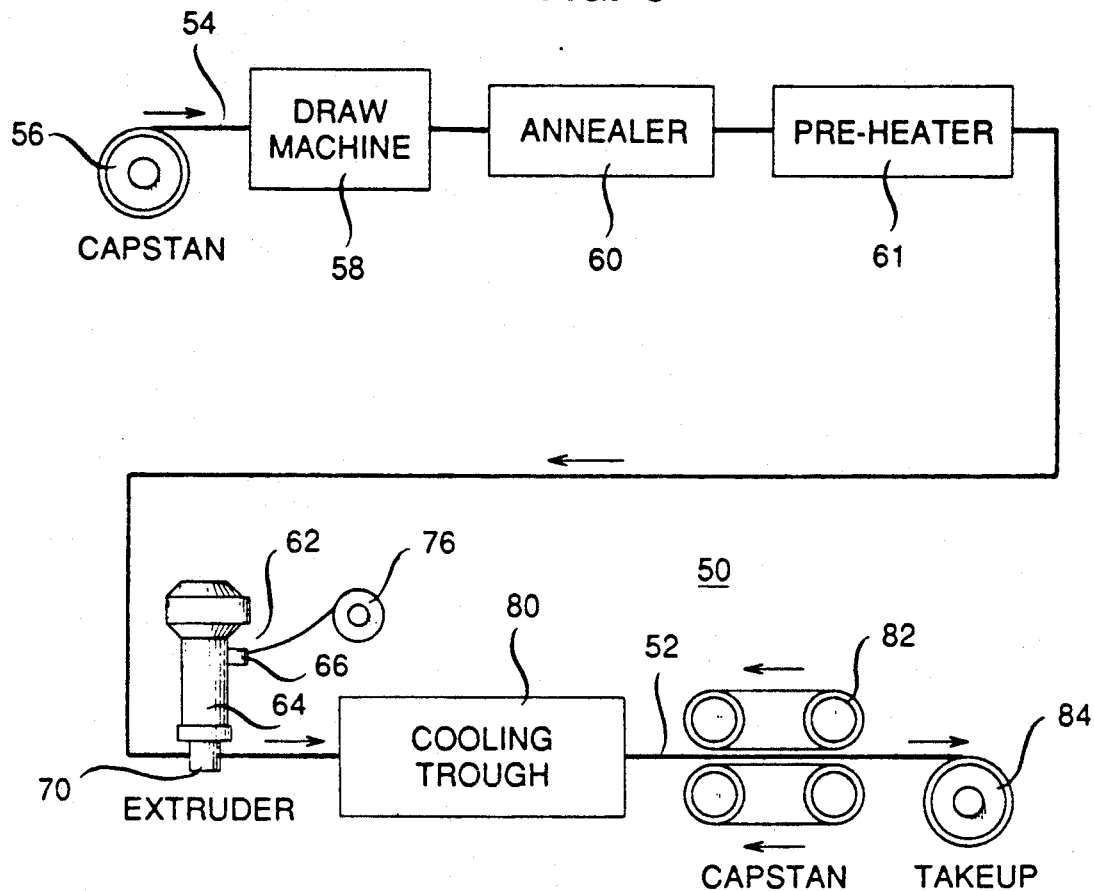
FIG. 3 is an overall view of a manufacturing line for applying plastic insulating material to a moving transmission medium.

Referring now to FIG. 3, there is shown a manufacturing line designated generally by the numeral 50. The line 50 is used to manufacture an insulated conductor such as that shown in FIG. 4 and designated generally by the numeral 52. As is seen, the line 50 includes a supply of elongated metallic material 54 such as copper, for example. The metallic material is payed off a spool 56, and drawn to a desired gauge size on a draw machine 58. Afterwards it is annealed in an annealer 60 and passed through a preheater 61 prior to its movement though an extruder 62.

Figure 5:
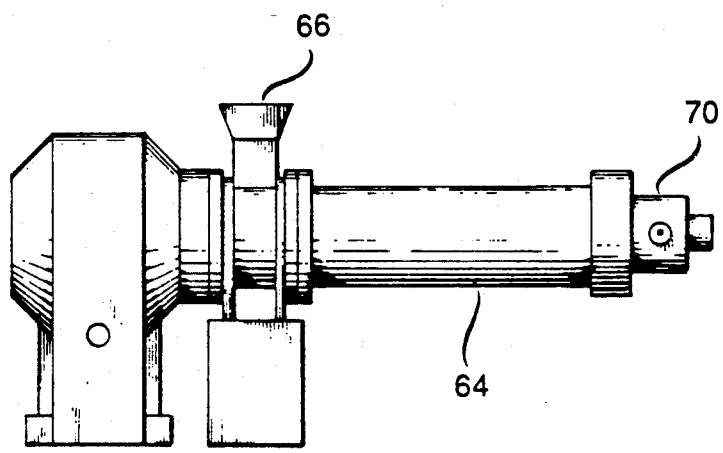
FIG. 5 is an elevational view of an extruder which is included in the manufacturing line of FIG. 3.

The extruder 62 (see also FIG. 5) includes a barrel 64 which is fed by a hopper 66. A screw (not shown) is disposed in the barrel 64 and is turned to move plastic material fed in the hopper along the barrel to a crosshead 70. As is well known, molted plastic material is applied by tooling (not shown) within the crosshead. The applied plastic extrudate provides an insulation cover 72 (see FIG. 4) on the moving metallic conductor.

Returning now to FIG. 3, the hopper 66 is supplied with a plastic material to be melted and conveyed to the crosshead. As has been mentioned hereinbefore, typically this has been accomplished by feeding pellets into the hopper. The pellets have been provided in cartons positioned adjacent to an extruder for resupply of the hopper or may be conveyed pneumatically from a point of delivery to the hopper. In accordance with this invention, plastic material in elongated strand form is supplied to the hopper 66. The elongated strand plastic material may be supplied from a barrel (not shown) or a spool 76 adjacent to the extruder barrel. In either case, continuous feed may be accomplished by cutover to additional barrels or spools.

The plastic material which is fed to the extruder barrel is caused to be melted as it is moved and worked in each of a plurality of zones. Pellets become unnecessary.

After the plastic extrudate has been applied to the moving metallic conductor 54 in the extruder crosshead 70, the insulated conductor 52 is moved into and through a cooling trough 80 by a capstan 82. The successive increments of length of the insulated conductor 52 are taken up on a spool 84, for example.

The successive increments of length of the supply of the elongated plastic material may be fed directly into a feed throat 90 (see FIG. 2) of an extruder barrel or of a molding press. However, there may be instances when the plastic material needs to be dried before it enters that portion of the using apparatus which causes it to become a molten mass. In those instances, the apparatus 20 or 50 may include a hopper which is disposed between the feed throat and the rollers 38—38. Provisions for supplying heat energy to the plastic material as it is fed through the hopper into the feed throat may be included in the hopper.

Thus far, the invention has been described as feeding one or more strands of plastic material into a feed throat of a using apparatus. There may be instances when it is desired to blend two or more materials prior to the forming of the plastic material into an article having a desired configuration. As was seen hereinbefore, such an article could be one of indefinite length or could be a discrete article. In those instances, two or more strands of different plastic materials are fed into a feed throat of the using apparatus and are blended together as the plastic materials are caused to become a molten mass and worked to a homogeneous mass.

It should be noted that even though an extrusion die has been specifically recited as the means used to form the molten plastic material into the particular configuration desired, any well known plastic-shaping apparatus is deemed within the scope of the present invention. Specifically, an injection mold process may be the chosen method used to form the plastic material into a desired configuration.

It is to be understood that the above-described arrangements are simply illustrative of the invention. Other arrangements may be devised by those skilled in the art which will embody the principles of the invention and fall within the spirit and scope thereof.

I claim:

1. A method of making a plastic-covered transmission medium, said method comprising the steps of:

providing a plurality of elongated strands of different plastic materials of indefinite length each of which has a generally circular cross section normal to a longitudinal axis thereof and which are capable of being melted and blended in a plastic-shaping apparatus to provide a molten plastic material and of being fed through the plastic-shaping apparatus to become formed into a desired configuration;

advancing an elongated transmission medium of indefinite length through the plastic-shaping apparatus;

guiding successive increments of each length of the elongated strands of plastic material to one end of the plastic-shaping apparatus which is capable of causing the plastic material to be melted and to be formed into a desired configuration;

causing the successive increments of length of each of the elongated strands of plastic material to be fed between a pair of adjacently aligned and cooperatively disposed rollers at least one of which has a plurality of circumferential grooves formed in a peripheral surface thereof into the one end of the plastic-shaping apparatus, the rollers having longitudinal axes parallel to each other and being effective to enhance the feeding of plurality of strands of different plastic materials;

causing the successive increments of length of each of the elongated strands of material to become disposed in a homogeneous molten mass within the plastic-shaping apparatus; and causing a portion of the molten mass to be fed through the plastic-shaping apparatus into juxtapositior with successive increments of length of the transmission medium to form a covering therefor; and moving the transmission medium with the plastic covering thereabout from the plastic-shaping apparatus into ambient atmosphere and then into a cooling trough to cool the covering; and taking up the plastic-covered transmission medium.

2. The method of claim 1 wherein said circumferential grooves establish transport channels for each of the individual elongated strands.

3. The method of claim 2 wherein said plurality of circumferential grooves are individually loaded with different plastic materials.

4. The method of claim 3 wherein said pair of cooperatively disposed rollers apply a positive force to each of the elongated strands effective to enhance the movement of the strands.

5. The method of claim 1 wherein one of the pair of cooperatively disposed rollers has a substantially smooth surface.

6. The method of claim 5 wherein the smooth roller acts as a friction roller to apply a positive feed force to the elongated strands to enhance the movement of the strands through a processing path.

7. The method of claim 1 wherein said plastic-shaping apparatus comprises an extruder.

8. The method of claim 1 wherein said plastic-shaping apparatus comprises an injection mold device.

* * * * *